Dec. 21, 1965   O. W. OHLSSON   3,224,101
APPARATUS FOR THE MEASUREMENT OF PHYSICAL QUANTITIES
Filed May 15, 1961   5 Sheets-Sheet 1
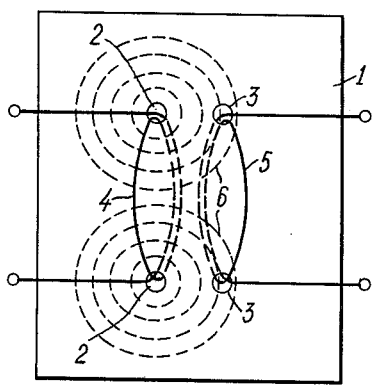
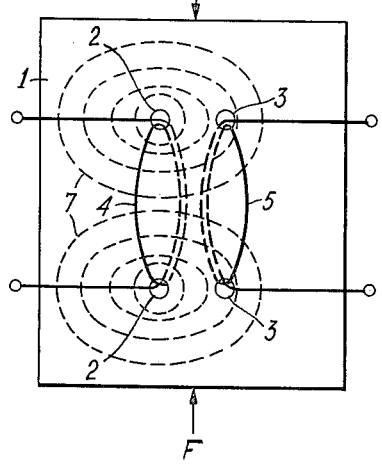
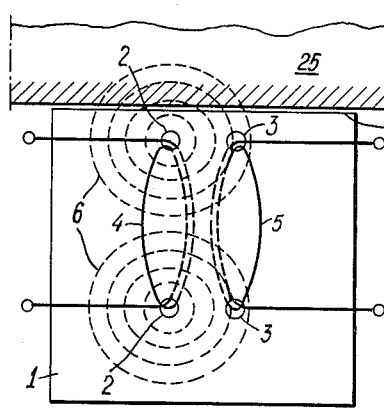
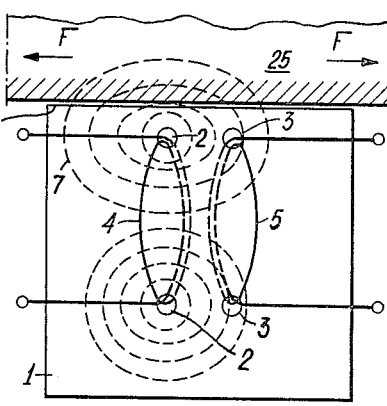
INVENTOR
Olof Werner Ohlsson
BY Sommers & Young
ATTORNEYS Dec. 21, 1965    O. W. OHLSSON    3,224,101
APPARATUS FOR THE MEASUREMENT OF PHYSICAL QUANTITIES
Filed May 15, 1961    5 Sheets-Sheet 2

INVENTOR
Olof Werner Ohlsson
BY Sommers+Young
ATTORNEYS

Dec. 21, 1965         O. W. OHLSSON         3,224,101
APPARATUS FOR THE MEASUREMENT OF PHYSICAL QUANTITIES
Filed May 15, 1961                          5 Sheets-Sheet 3

INVENTOR

Olof Werner Ohlsson
BY Sommers & Young
ATTORNEYS

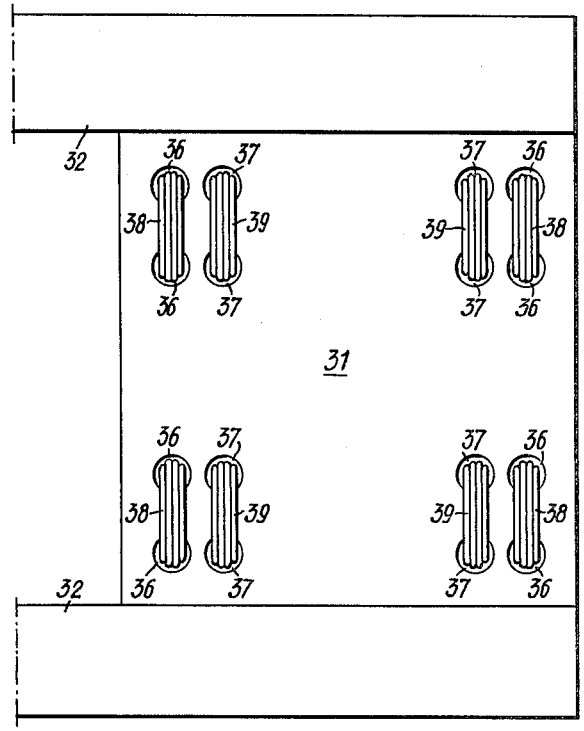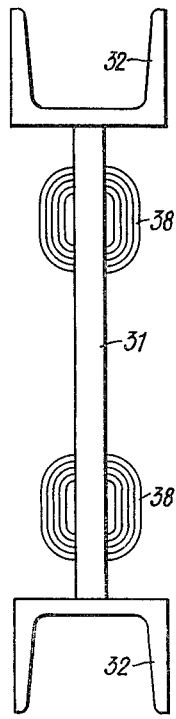

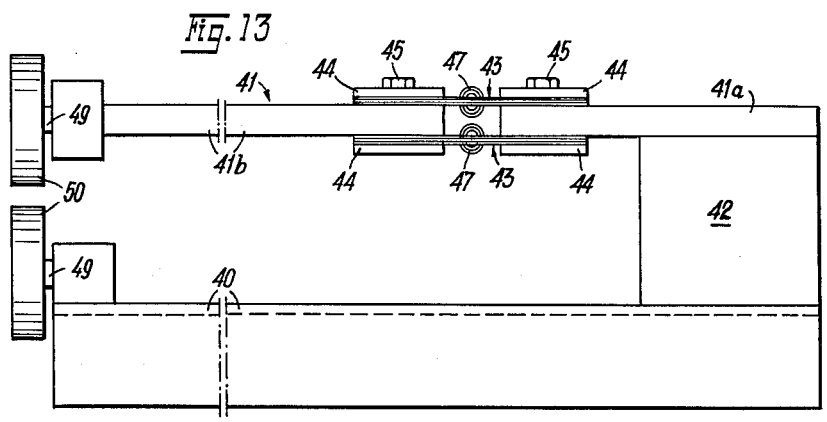
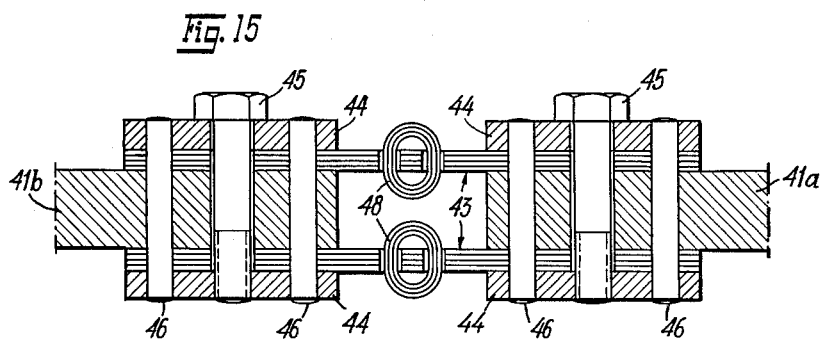
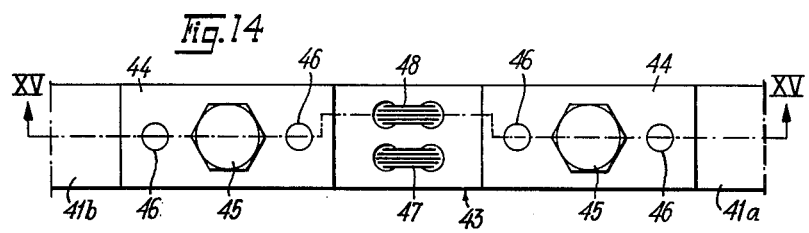

United States Patent Office 3,224,101
Patented Dec. 21, 1965

3,224,101
APPARATUS FOR THE MEASUREMENT OF PHYSICAL QUANTITIES
Olof Werner Ohlsson, Jonkoping, Sweden, assignor to Svenska Tandsticks Aktiebolaget, Jonkoping, Sweden
Filed May 15, 1961, Ser. No. 110,115
Claims priority, application Sweden, May 14, 1960, 4,780/60; July 1, 1960, 6,416/60; July 29, 1960, 7,340/60
11 Claims. (Cl. 33—143)

This invention generally relates to an apparatus for the measurement of physical quantities, such as thickness or mechanical stress or strain, by the utilization of the so called magneto-strictive effect.

A measuring apparatus according to the invention comprises at least one measuring body of magnetic material, adapted to be subjected to mechanical loads of a magnitude varying in dependence of the value of the measured quantity, at least one energizing winding and at least one measuring winding, said windings embracing at least part of the measuring body and being adapted to be coupled to a voltage source and a measuring instrument respectively.

In a strain or load measuring apparatus of the kind referred to above the mutual inductance of the energizing and measuring windings was made substantially equal to zero, in the unloaded state of the measuring body, by disposing the windings in planes crossing each other at right angles. The lines of force of the alternating magnetic flux, which is generated in the measuring body when the energizing winding is connected to a source of alternating current, then in the main form tangents to the plane of the measuring winding when the body is mechanically unstressed, and accordingly substantially no electro-motive force is induced in the measuring winding. If the measuring body becomes mechanically loaded or stressed, the magnetic anisotrophy of the material will cause a deformation of the magnetic lines of force in the body, so that a greater or less portion, dependent upon the value of the mechanical load, of the lines of force will pass through the measuring winding and induce an electro-motive force therein.

In this device of the prior art a voltage sensitive means coupled to the measuring winding will indicate a certain initial voltage when the measuring body is mechanically unloaded. Under load, when the magnetic flux is deformed, so that some lines of force penetrate the measuring winding at a very acute angle, a voltage is induced therein of a magnitude varying in dependence of the value of the mechanical load. The relation between the mechanical load and the voltage induced in the measuring winding is substantially rectilinear except in the domain where the load is small. In this domain the induced voltage first decreases at increasing load from said initial value at the load zero and then begins to increase when the load is further increased. This non-linearity may be compensated by means of certain artifices, such as an auxiliary load upon the measuring body, but it still involves a substantial drawback and complication when relatively small loads or strains are to be measured.

A general object of the invention is to provide a very sensitive measuring apparatus of the above mentioned kind which does not require an amplifier between the measuring winding and the measuring instrument and which has a substantially recti-linear relationship between the magnitude of the quantity measured and the voltage induced in the measuring winding, even when said quantity and the mechanical load upon the measuring body during the measurment approaches zero.

A more particular object of the invention is to provide a simple, inexpensive, sensitive and reliable apparatus for the measurement of mechanical loads which is based upon the magneto-elastic effect.

A further particular object of the invention is to provide an improved apparatus for the measurement of mechanical strains or loads which is adapted to be positioned adjacent to, or in contact with, a machine element or another object consisting of a magnetic material and the mechanical strain of which is to be measured, in such a way, that the magnetic flux generated by the energizing winding penetrates, in part, said machine element and is influenced by said load exerted thereupon, so that any substantial intrusion in the machine element for the insertion of the transmitter therein is avoided.

A still further particular object is to provide an improved apparatus for the measurement of the thickness of a sheet- or weblike object, which apparatus is based upon the magneto-elastic effect, is in-sensitive to temperature variations and is not subjected to disturbing influence by mechanical transmission means, and permits measurements at a contact pressure adequate to different purposes. Thickness gauges of this kind may be used i.a. in paper, chipboard and fiber board industries, in sheet rolling mills and so on.

With these and other objects in view the apparatus according to the invention is primarily characterised therein, that said energizing and measuring windings are located at the side of and spaced from one another and that a portion of the energizing winding extending from a surface of the measuring body to another surface thereof facing in the opposite direction is separated from the measuring winding, at least at measurement, by magnetic material surrounding said winding portion, so that a substantial portion, varying in dependence of the load upon the measuring body, of the magnetic flux induced in the measuring body by the energizing winding closes itself through said magnetic material outside the measuring winding without passing through the same, simultaneously as another substantial portion of said magnetic flux closes itself through said measuring winding.

Further objects and advantages of the invention will become more fully apparent from the following description and the accompanying drawings illustrating some preferred embodiments of the invention, and in which:

FIGS. 1 and 2 disclose the principle of the invention as applied to a measuring body in strained and unstrained conditions respectively;

FIGS. 3–8 represent measuring devices according to further embodiments of the invention, said measuring devices being positioned adjacent to a machine element or the like of magnetic material;

FIG. 11 is a side elevation on a larger scale of the right hand portion of the thickness gauge according to FIG. 10;

FIG. 12 is an end view from the right on a larger scale of the thickness gauge represented in FIG. 10;

FIG. 13 is a side view of a modified embodiment of the thickness gauge illustrated in FIGS. 10–12;

FIG. 14 is a plan view on a larger scale of a portion of the thickness gauge according to FIG. 13;

FIG. 15 is a partial section on line XV—XV in FIG. 14.

Figure 5:
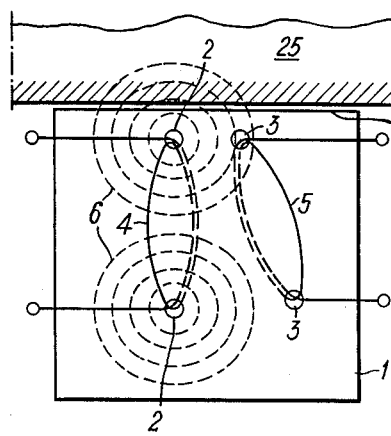

The device represented in FIGS. 1 and 2 comprises a measuring body 1 which is comprised of one snigle sheet of a ferro-magnetic material or a plurality of sheets stacked upon each other. Said measuring body is supposed to be disposed in a machine element or the like or to form part of a thickness gauge of the kind described below. The measuring body 1 has two pairs of openings in the shape of through holes 2 and 3 respectively so located, that they form the apexes of a rectangle. These holes form passages, on one hand, for an energizing winding 4 passing through the pair of holes 2, located above each other, and adapted to be connected to a source of alternating current, and on the other hand, for a measuring winding 5 passing through the pair of holes 3 located to the right of the holes 2, and adapted to be connected to an instrument for the measurement of the voltage induced in the measuring winding 5.

In the measuring body 1 a variation of the mechanical load gives rise to changes of the permeability, and this effect may be utilized to determine the magnitude of the alteration of said load upon the measuring body.

FIGS. 1 and 2 illustrate how this effect may be utilized to determine said magnitude and thereby also e.g. the magnitude of a mechanical strain or the thickness of an object to be measured.

When alternating current flows in the energizing winding 4, there is created in the measuring body 1 round the holes 2 and alternating magnetic flux the ilnes of force of which, when the body is mechanically unloaded, correspond to the dotted lines 6 shown in FIG. 1 which in the main consist of circles substantially concentric with the holes 2 but slightly compressed or flattened between these holes. If the body should be loaded or strained mechanically, e.g. by pressure, as is illustrated by means of arrows F in FIG. 2, the magnetic flux will be deformed, on account of the magnetic anisotrophy arising in the body, in such a way that the lines of force become still more flattened and resemble ellipses, as shown at 7 in FIG. 2.

When studying FIGS. 1 and 2 it is further seen that as well as when the measuring body is mechanically unloaded according to FIG. 1 as when it is strained as shown in FIG. 2, a substantial portion of the magnetic lines of force pass through the measuring winding 5, and that a greater fraction of the magnetic flux passes through the measuring winding 5 in the latter case, when the lines of force are flattened on account of the mechanical strain, than when the body 1 is not loaded or strained. Therefore, there is induced, over the measuring winding, a voltage which from an initial voltage of substantial magnitude increases linearly with increasing load and decreases linearly with decreasing load upon the measuring body 1.

A device of the kind described above in conjunction with FIGS. 1 and 2 comprising a measuring body 1 provided with energizing and measuring windings 4 and 5 respectively is called "transmitter" in this specification.

It is not necessary that a transmitter according to FIGS. 1 and 2 be built in, in a machine element or the like, but it may for instance be positioned adjacent to or in contact with the element in question when the strain thereof is to be measured.

In the embodiment according to FIGS. 3 and 4 which correspond, in all essential respects, to FIGS. 1 and 2 respectively same reference characters have been used to indicate similar parts. In FIGS. 3 and 4 an edge 26 of the measuring body 1 is positioned close to a machine element or the like 25 which is, according to FIG. 4 subjected to a tension, as indicated by arrows F. As shown in these figures part of the magnetic flux surrounding the holes 2 penetrates the member 25. Even here the portion of the magnetic lines of force passing through the measuring winding 5 becomes more or less altered in dependence of the magnitude of the pull or tension.

If the member 25 should be subjected to pressure in opposite direction with respect to the arrows F in FIG. 4, the lines of force will become deformed in such a way, that the major axes of the ellipses formed becomes vertical in lieu of horizontal and the number of magnetic lines of force passing through the measuring winding 5 decreases. Accordingly a voltage measuring instrument coupled to the measuring winding will then indicate a less reading.

If the machine element should be stationary, the measuring body 1 could be positioned with its edge 26 in contact with the element in the manner described above, the air gap between said members then becoming a minimum. The apparatus may also be designed for the measurement of the mechanical load upon moving parts of a machinery, such as rotating shafts. The measuring body may in such a case either be mounted stationary with its edge 26 located relatively close to the machine element, or be mounted in such a way, that it takes part in the movements of the machine element. In the latter case the measuring body 1 may be placed in contact with the machine element as in the case first described. When the machine element has a reciprocating motion the energizing and measuring windings may be connected to their respective circuits through flexible wires. When, on the other hand, the machine element rotates continuously in but one direction, it is necessary to arrange the electrical connection of the windings in another way, e.g. inductively.

Figure 6:
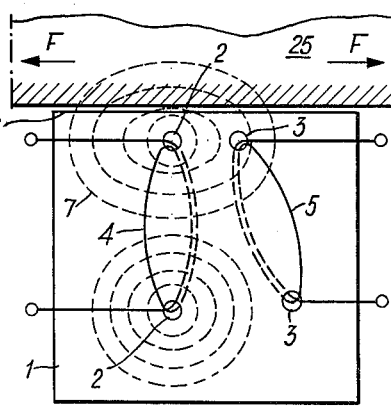

If it is desirable to avoid influence upon the measuring winding 5 from the relatively constant magnetic flux of the energizing winding 4 around the lower hole 2, the lower hole 3 of the energizing winding 4 may be located, according to FIGS. 5 and 6, in such a way, that said portion of the magnetic flux closes itself substantially outside the measuring winding 5. In this case the plane of the measuring winding 5 forms an acute angle with the plane of the energizing winding 4.

Figure 7:
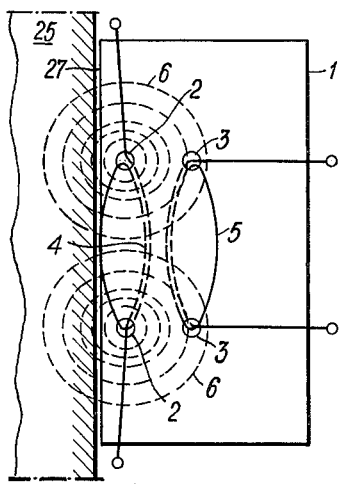
Figure 8:
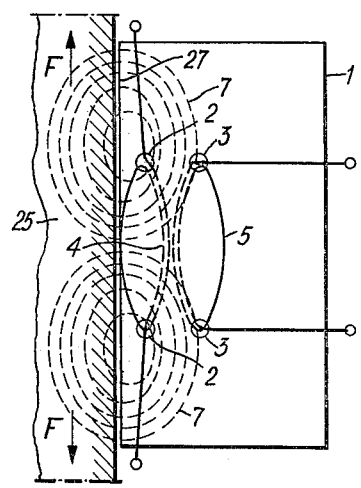

In the alternative embodiment according to FIGS. 7 and 8 the energizing winding 4 is arranged, close to that edge 27 of the measuring body 1 which is parallel to the plane of the energizing winding 4, and in this instance the magnetic flux around the two holes 2 will be deformed in dependence of the load upon a machine element 25 located close to the edge 27, and parallel thereto.

Figure 9:
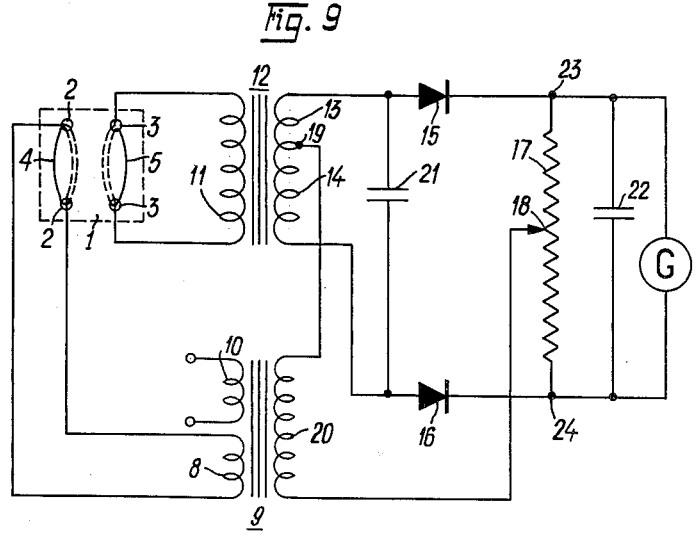
FIG. 9 is a circut diagram for an instrument coupled to the measuring winding to indicate the voltage induced therein.

According to the circuit diagram of FIG. 9 the voltage induced in the measuring winding 5 may be measured by means of a galvanometer G arranged in a phase-sensitive rectifier or detector circuit. The energizing winding 4 is connected to a secondary winding 8 in a transformer 9 the primary winding 10 of which is connected to the main electric supply system having a tension of e.g. 220 volts. The measuring winding 5 is connected to a winding 11 in another transformer 12. The galvanometer G is connected to two serially connected secondaries 13 and 14 of the lastmentioned transformer 12 through (diode) rectifiers 15 and 16 connected to the outer ends of the secondaries 13 and 14 respectively, and in addition to that a potentiometer 17 is connected in parallel with the galvanometer G. The movable contact 18 of the potentiometer is connected to one end of a second secondary 20 of the transformer 9 and the junction 19 between the secondary windings 13 and 14 of the transformer 12 is connected to the other end of said secondary winding 20 of the transformer 9. A capacitor 21 connected to the outer ends of the series circuit consisting of windings 13 and 14 forms a parallel resonant circuit tuned to the frequency of the mains, e.g. 50 or 60 cycles. In addition to this a smoothing capacitor 22 is coupled in parallel with the potentiometer 17 and the galvanometer G.

The alternating voltage generated over the winding 20 influences simultaneously the rectifiers 15 and 16 in their forward (current conducting) direction every second half cycle and thereby gives rise to direct impulses through the parts of the potentiometer 17 separated by the movable contact 18. Accordingly, the terminals 23 and 24 of the potentiometer have applied to them direct voltage impulses of the same sign, which also will be of the same magnitude after suitable setting of the movable contact 18 of the potentiometer. Therefore galvanometer G will not show any deflection caused by winding 20. In windings 13 and 14 there will be induced voltage impulses of the frequency of the mains and of a magnitude depending upon the voltage induced in the measuring winding 5. During one half cycle such a voltage impulse gives rise to a current impulse e.g. through winding 13 coinciding with and having the same polarity as a current impulse from winding 20. The voltage simultaneously induced in winding 14 can, however, not give rise to any current, since this voltage influences rectifier 16 in its reverse or blocking direction. The current impulse from winding 13 is hereby superimposed upon the current impulse from winding 20 in the upper half of the potentiometer 17 and increases the potential of the terminal 23. During the next half cycle when no current impulse caused by winding 20 through potentiometer 17 is obtained, winding 14 causes a current impulse to flow through rectifier 16 and the lower portion of potentiometer 17, so that a voltage impulse is impressed upon the lower terminal 24 of the potentiometer. Winding 20 is, however, proportioned to give a greater increment to the potential of the terminals 23, 24 than windings 13 and 14, and therefore the lastmentioned voltage impulse from winding 14 occurring in the interval between the voltage impulses from winding 20 will cause no increment to the potential of terminal 24. Accordingly, there will exist between terminals 23, 24 and over the galvanometer G a potential difference the magnitude of which is directly dependent of the voltage induced in the measuring winding 5.

Since a voltage is induced in the measuring winding 5 even when the measuring body 1 is unloaded or positioned with one of its edges close to an unstrained or unloaded machine element, galvanometer G should show a certain reading if the movable contact 18 of the potentiometer should be in such a position, that the galvanometer shows no reading if the circuit through the measuring winding 5 were open. In practice the movable contact 18 of the potentiometer is so adjusted, that galvanometer G shows no reading when the measuring winding 5 is interconnected in the circuit and the measuring body 1 or the machine element or the like at which the measuring body is disposed is unloaded or unstrained in mechanical respect. The reading of galvanometer G will then be directly proportional to the magnitude of the mechanical load of the measuring body or the object to be tested and the magnitude of the quantity measured.

Another domain of application for the invention is the measurement of the thickness of a web or another, preferably sheet-like object, such as wall-board, paper-board or chip-board plates. Two embodiments or thickness gauges comprising at least one transmitter according to the invention are represented in FIGS. 10–12 and 13–15 respectively. Such thickness gauges are particularly adapted for continuous control of the paper thickness in paper making machines or of the sheet thickness in sheet and plate rolling mills.

Figure 10:
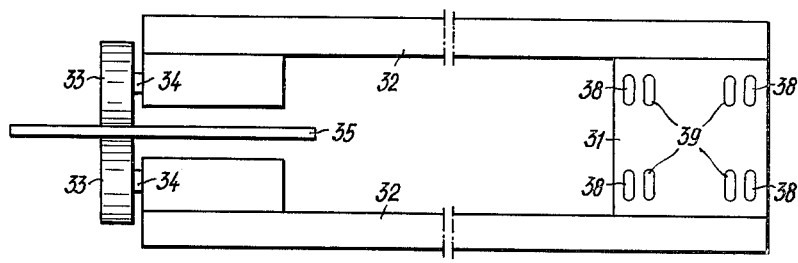
FIG. 10 is a side view of a thickness gauge in the shape of measuring tongs having two shanks rigidly secured to a measuring body.

The thickness gauge according to FIGS. 10–12 comprises, as is most clearly shown in FIG. 10, a pair of measuring tongs having two shanks 32 rigidly secured to a measuring body 31. The shanks which are made of U-iron in the embodiment shown carry at their free ends measuring rollers 33 rotatably journalled on stub axles 34 parallel to the longitudinal direction of shanks 32. Rollers 33 may advantageously have slightly different diameters in order to avoid influence upon the measurement from any deficiencies in the roundness of the rollers, or from possible eccentricity in their journalling. The rollers may be outer rings of anti-friction bearings having their inner rings fitted on the stub axles 34. Particularly when measuring the thickness of such objects as paper of which the thickness variations are of about the same magnitude as the tolerance of the roundness of the balls or rollers of the anti-friction bearings, stationary feelers or the like of a durable material, such as steel or Teflon (polytetrafluorethylene) may advantageously be substituted for the rollers 33.

In the measuring body 31 which is made of ferro-magnetic material like those of the embodiments described above 16 holes are provided. These holes are arranged in four groups, each group comprising two pairs of holes 36 and 37 (FIG. 11) respectively and located near a corner of the rectangular measuring body 31. The pairs of holes 36 and 37 respectively of each group are arranged, as before, in such a way, that they form the apexes of a rectangle. In each group an energizing winding 38 is wound through the holes 36 of one pair and is adapted to be connected to a source of alternating current (not shown). Through the remaining pair of holes 37 of each group a measuring winding 39 is wound, which is adapted to be connected to a suitable measuring instrument (not shown).

Measuring rollers 33 are located at such a distance from each other, that the object 35, the thickness of which is to be measured, when introduced between the measuring rollers 33 separate the same and hereby forces shanks 32 away from one another with a force of suitable magnitude. Of course, this force must not be so great that a substantial compression of the object measured arises. The force must not be so great either, that the elastic domain of the deflection of the shanks is exceeded and permanent deformation arises. When the measurements are carried out within said domain, said force and also the load upon the measuring body 31 will be directly proportional to the thickness of the object measured 35, and its thickness may then be read on an instrument G suitably calibrated or graduated and of the kind referred to above in conjunction with FIG. 9, the reading of which may be made directly proportional to said load and accordingly also to the thickness of the object measured.

The measuring winding 39 are mutually connected in series in such a manner, that the voltages induced therein, when the measuring body is loaded, add to each other and a greater deflection is obtained on the instrument. In this connection it should be noted that the portions of the measuring body 31 located nearest to rollers 33 at thickness measurement, when shanks 32 are deflected outwards, are subjected to tensional strain simultaneously as those portions of the measuring body 31, which are located farthest from the measuring rollers 33, are subjected to compressive strain. At thickness measuring the voltages induced in those measuring windings 39 which are located in the firstmentioned portion of the measuring body will decrease simutaneously as the voltages induced in those measuring windings increase which are located farthest from the measuring rollers 33. When interconnecting the windings it is most suitable to use the method of "trial and error." One measuring winding is coupled to the galvanometer G and the reading thereof at load is observed. Then next measuring winding is connected in series with the first one, and the alteration of the reading of the galvanometer at the same load is observed.

If the reading should become smaller, it is necessary to disconnect the measuring winding last interconnected and reconnect it with its connectors shifted. The reading of the instrument should now be greater than that of the first measurement.

The object 35 to be measured, e.g. a web of paper or sheet metal may be advanced continuously between the measuring rollers 33. The galvanometer G or an equivalent instrument may be adapted to record the reading as a curveline on a movable sheet, so that a continuous recording of the thickness along the web is obtained.

Of course, the measuring apparatus is also sensitive to forces tending to displace the shanks towards each other.

The rollers 33 or feelers corresponding thereto of the measuring apparatus according to the invention may be subjected, when necessary, to a comparatively high pressure and, at the same time, be caused to measure the thickness of an object comparatively far from the edge of the object. This is particularly important when measuring the thickness of sheet metal having buckling tendencies.

In FIGS. 13–15 there is shown another embodiment of the thickness gauge according to the invention. As in the embodiment according to FIGS. 10–12 the thickness gauge has the shape of a pair of measuring tongs having two shanks connected to another by means of an intermediate member 42. Shank 40 can be considered non yielding. Shank 41 comprises two parts 41a and 41b interconnected by means of a pair of transmitters 43 of the kind illustrated in FIGS. 1–2 comprised of sheets of ferro-magnetic material as indicated above. The transmitters 43 are secured to the two parts 41a and 41b of shank 41 by means of pressure plates 44, which are tightly screwed together by means of bolts 45 and are adapted to prevent the plates of the transmitter 43 from warping. In order to prevent the individual plates of the transmitter from sliding with respect to one another guide pins 46 are provided which pass with forced fit through the two pairs of pressure plates 44 and through the two transmitters 43 and which also prevent the last-mentioned from moving in relation to the parts 41a and 41b of the upper shank. As in the embodiment according to FIGS. 1 and 2 each transmitter 43 is provided with an energizing winding 47 and a measuring winding 48.

As in the embodiment according to FIGS. 10–12 each of the shanks 40 and 41 carry, at their outer ends, a measuring roller 50 rotatably journalled on stub axles 49. These rollers may be outer rings of anti-friction bearings or may be replaced by stationary feelers as set forth before.

When an object to be measured is advanced between rollers 50, only the upper shank 41 is deflected on account of the rigidity of the lower shank 40. Hereby the measuring body comprised in the upper transmitter 43 is compressed and the measuring body comprised in the lower transmitter is subjected to tensional strain. When energizing windings 47 are connected to a source of alternating current, these changes of the load upon the measuring bodies give rise to a change of the voltage induced in the measuring windings 48. As before, the energizing windings 47 on one hand and the measuring windings 48 on the other hand are connected in series in such a manner, that the voltage changes arising in the two measuring windings 48 at thickness measurements are added to each other for obtaining greater sensitivity.

While the invention has been particularly shown and described with reference to some preferred embodiments thereof, it will be understood by those skilled in the art that various changes in form and detail may be made therein without departing from the spirit and scope of the invention.

Thus, it is not necessary that the measuring body is an individual part, but it may constitute an integral part of a machine element or the like. In this case, it is possible to bore two pairs of holes in one of the legs supporting a pulp digester or the like and arrange an energizing winding and a measuring winding in the respective pairs of holes. When the device is coupled to a measuring instrument, the reading of the instrument will constitute, after suitable calibration thereof a measure of the weight of the contents of the digester. The device described thus constitutes a balance which may be utilized to control the amount of chips added, when the digester is filled. In lieu of being threaded through holes in the measuring body, the energizing and measuring windings may be wound around and embrace the measuring body which may form part of a leg of a pulp digester, the magnetic flux then being closed by means of an outer yoke. One, two or more of the holes of the measuring body may, at least in the embodiments according to FIGS. 3–8, be replaced by recesses in the edge of the measuring body. If recesses in the edge of the measuring body are substituted, in these embodiments, for the holes located nearest the object 25 to be tested, that advantage is gained, that all magnetic lines of force surrounding these recesses, close themselves through the object to be tested which is supposed to consist of magnetic material.

As far as thickness gauges are concerned, the measuring tongs may, in one embodiment, comprise one single shank, if a stationary feed table or the like for the object to be measured can serve as the other shank.

In the embodiments shown the measuring bodies are comprised of a material having positive magnetostriction, but it is within the scope of the invention to make them of a material having negative magnetostriction. It is also possible to utilize e.g. pulsating direct current in lieu of alternating current without departing from the inventive idea.

New embodiments falling within the scope of the following claims may be created by combining details from the embodiments shown and described above.

Finally, the apparatus according to the invention is not limited to the measurement of thickness or mechanical strain, but may also be utilized for the measurement of other physical quantities, e.g. gas or fluid pressure.

What I claim is:

1. An apparatus for the measurement of physical quantities such as thickness or strain, by the utilization of the magnetostrictive effect, comprising a transmitter; said transmitter including a measuring body of ferro-magnetic material adapted to be influenced by mechanical strain varying in dependence on the magnitude of said physical quantity to be measured, a voltage source; said ferro-magnetic body having at least one energizing winding coupled to said voltage source, said body having a pair of openings therein for each energizing winding, and each energizing winding passing through its appurtenant pair of said openings; a measuring instrument, at least one measuring winding coupled to said measuring instrument; said ferro-magnetic body also having a pair of openings therein for each measuring winding and each measuring winding passing through its appurtenant pair of openings; said pairs of openings for said energizing winding and for said measuring windings being separated from each other by ferro-magnetic material, and said ferro-magnetic material extending continuously around each of said openings; said windings extending at the side of each other without crossing each other; the combined area of all of said openings being only a small fraction of the ferro-magnetic remainder of the measuring body, viewed in plan, in order to ensure, that a substantial portion of the magnetic flux generated by said energizing winding passes through the measuring winding when said measuring body is subjected to mechanical strain as well as when it is not, and that the remaining, likewise substantial portion of said magnetic flux, passes outside said measuring winding when said measuring body is subjected to mechanical strain as well as when it is not, the proportions between said two portions of the flux passing through the measuring winding and outside the same respectively varying in dependence on the mechanical strain to which said measuring body is subjected and accordingly also in dependence on the magnitude of the quantity being measured.

2. An apparatus as claimed in claim 1, and comprising at least one measuring body so disposed that the direction of the load, to which the measuring body is subjected, is substantially parallel to a plane passing through the openings of the energizing winding, substantially symmetrically thereto.

3. An apparatus as claimed in claim 1, in which the planes of said energizing and measuring windings are disposed substantially parallel to each other.

4. An apparatus for the measurement of mechanical force by the utilization of the magneto-strictive effect, comprising a transmitter; said transmitter including a measuring body of ferro-magnetic material having at least one smooth edge and adapted to be influenced by said mechanical force to be measured by having its edge juxtaposed to and in extended surface contact with a ferro-magnetic member which is subjected to said mechanical force; said ferro-magnetic body having at least four openings therein arranged in a quadrilateral and with the ferro-magnetic material of said body extending continuously around each of said openings; at least one energizing winding threaded through two of said openings located along one of the sides of the quadrilateral; a voltage source coupled to said energizing winding; said energizing winding being disposed so close to said edge that at least a substantial portion of the magnetic flux generated by said energizing winding penetrates said member and is influenced by said mechanical force; at least one measuring winding threaded through the other two openings in said measuring body located on the side of said quadrilateral opposite the energizing winding; a measuring instrument coupled to said measuring winding; said windings being located at the side of each other and at such a distance from each other that a substantial portion of the magnetic flux generated by said energizing winding passes through the measuring winding both when said measuring body is influenced by mechanical strain and when it is not, and the remaining, likewise substantial, portion of said magnetic flux passes outside said measuring winding both when said measuring body is influenced by mechanical strain and when it is not, the proportion between said two portions of the flux passing through the measuring winding and outside the same respectively, varying in dependence on the mechanical strain to which said ferro-magnetic member is subjected.

5. An apparatus as claimed in claim 4, and in which one of said openings of a pair of openings through which one of said energizing windings is threaded is located adjacent to said edge of the measuring body while the other opening of said pair is more distant therefrom.

6. An apparatus as claimed in claim 5, in which one of said openings through which said measuring winding is threaded is located so far from that opening of said energizing winding which is most distant from said edge of the measuring body, that the portion of the magnetic flux surrounding the last mentioned opening closes itself substantially outside said measuring winding.

7. An apparatus as claimed in claim 4, in which said openings in the measuring body through which said energizing winding is threaded are located between said edge and said measuring winding cooperating with said energizing winding.

8. An apparatus as claimed in claim 4, and in which the plane of the energizing winding is substantially parallel to the direction of the force being measured.

9. A thickness gage including two measuring shanks extending substantially parallel to each other and adapted to encompass a member subject to thickness measurement; a transmitter rigidly secured to one end of each of said shanks and, thus, interconnecting said ends; a pair of feelers secured to the free end of said shanks and adapted to engage opposite surfaces of said member and to be mutually separated together with their respective shank, by said member, whereby different portions of said transmitter become subjected to tensional and compressive strains respectively during measurement; said transmitter comprising a substantially solid measuring body of ferro-magnetic material having a first plurality of individual pairs of openings in that portion thereof which is subjected to tensional strain during a measurement, a first plurality of energizing windings threaded through said first individual pairs of openings; said body also having second individual pairs of openings in that portion thereof which is subjected to compressive strain during a measurement, a second plurality of energizing windings threaded through said second indivdual pairs of openings in the portion of said body subjected to compressive strain during a measurement; a voltage source, said energizing windings being interconnected with each other and coupled to said voltage source; said body also having other individual pairs of openings in that portion thereof which is subjected to tensional strain during a measurement, a plurality of measuring windings equal in number to said first plurality of energizing windings and threaded through said other set of openings in the portion of said body subjected to tension during a measurement, said body also having further individual pairs of openings in the portion thereof subjected to compression during a measurement, another plurality of measuring windings equal in number to the number of said further pairs of openings in said portion thereof subjected to compressive strain and threaded through said other set of individual pairs of openings in the portion of said body subjected to compression during a measurement; said measuring windings being interconnected with each other in additive relationship with respect to voltages induced therein by the respective energizing windings and coupled to said measuring instrument, each of said measuring windings being located at the side of an associated energizing winding and at such a distance therefrom that a substantial portion of the magnetic flux generated by said energizing windings passes through the respective measuring windings when said measuring body is subjected to mechanical strain as well as when it is mechanically unloaded, and that the remaining, likewise substantial portion of said magnetic flux passes outside the respective measuring windings when said measuring body is subjected to mechanical strain as well as when it is mechanically unloaded, the proportions between said two portions of the flux passing through the measuring windings and outside the same respectively varying in dependence on said mechanical strain to which said measuring body is subjected and accordingly also in dependence of the thickness of the member measured.

10. An apparatus for the measurement of physical quantities, such as thickness or strain, by the utilization of the magneto-strictive effect comprising a base, an elongated measuring shank which is rigidly secured to said base at one of its ends; a load transmitting element at the free end of said measuring shank adapted to be actuated by a member subject to measurement to cause thereby deflection of said measuring shank by said member at measurement; a voltage source; and a voltage sensitive measuring instrument; said measuring shank being comprised of two aligned portions, viz. one outer portion to which said load transmitting element is secured and one inner portion which is secured to said base, and at least two substantially solid measuring bodies of ferromagnetic material engaging opposite surfaces of the inner and outer portions of said measuring shank and secured thereto to rigidly interconnect said outer and inner portions of said measuring shank in such a manner, that different portions of said measuring bodies become subjected to tensional and compressive strains respectively at measurement when said shank is deflected, said measuring bodies forming parts of transmitters also comprising at least one energizing winding threaded through a pair of openings in such portions of the measuring bodies as are subjected to tensional strain at measurement, at least one energizing winding threaded through a pair of openings in such portions of the measuring bodies as are subjected to compressive strain at measurement, said energizing windings, being interconnected with each other and coupled to said voltage source, at least one measuring winding threaded through a pair of openings in such portions of said measuring bodies as are subjected to compressive strain at measurement, at least one measuring winding threaded through a pair of openings in such portions of the measuring bodies as are subjected to tensional strain at measurement, said measuring windings being interconnected with each other in additive relationship with respect to voltages induced therein by the respective energizing windings and coupled to said measuring instrument, each of said measuring windings being located at the side of an associated energizing winding and in such a distance therefrom that a substantial portion of the magnetic flux generated by said energizing windings passes through the respective measuring windings as well when said measuring body is subjected to mechanical strain as when it is mechanically unloaded and that the remaining, likewise substantial portion of said magnetic flux passes outside the respective measuring windings as well when said measuring body is subjected to mechanical strain as when it is mechanically unloaded, the proportions between said two portions of the flux passing through the measuring windings and outside the same respectively varying in dependence of said mechanical strain to which said measuring body is subjected and accordingly also in dependence of the magnitude of the quantity measured.

11. An apparatus as claimed in claim 10, and constituting a thickness gage, in which said load transmitting element is a first feeler adapted to engage the upper face of a member subject to thickness measurement, and in which the base is rigid and provided with a second feeler located opposite to said first feeler and adapted to engage the lower face of said member for measurement of its thickness.

References Cited by the Examiner
UNITED STATES PATENTS

| | | | |
|---|---|---|---|
| 1,666,680 | 4/1928 | Buckley | 73—141 |
| 2,419,061 | 4/1947 | Emery | 73—88.5 X |
| 2,567,717 | 9/1951 | Lagerlof | 336—20 |
| 2,666,262 | 1/1954 | Ruge | 33—143 X |
| 2,815,424 | 12/1957 | Painter | 33—147 X |
| 2,867,118 | 1/1959 | Cavanagh | 73—141 |
| 2,895,332 | 7/1959 | Dahle | 73—141 X |
| 2,898,761 | 8/1959 | Hast | 73—141 X |
| 2,912,642 | 11/1959 | Dahle | 73—88.5 X |
| 3,000,101 | 9/1961 | Giarvdino | 33—143 |

LOUIS R. PRINCE, *Primary Examiner.*

LEONARD FORMAN, ISAAC LISANN, ROBERT L. EVANS, *Examiners.*